Dec. 22, 1959    J. A. FARNHAM ET AL    2,918,185
ROTARY CONE VALVE MEANS
Filed May 21, 1958    4 Sheets-Sheet 1
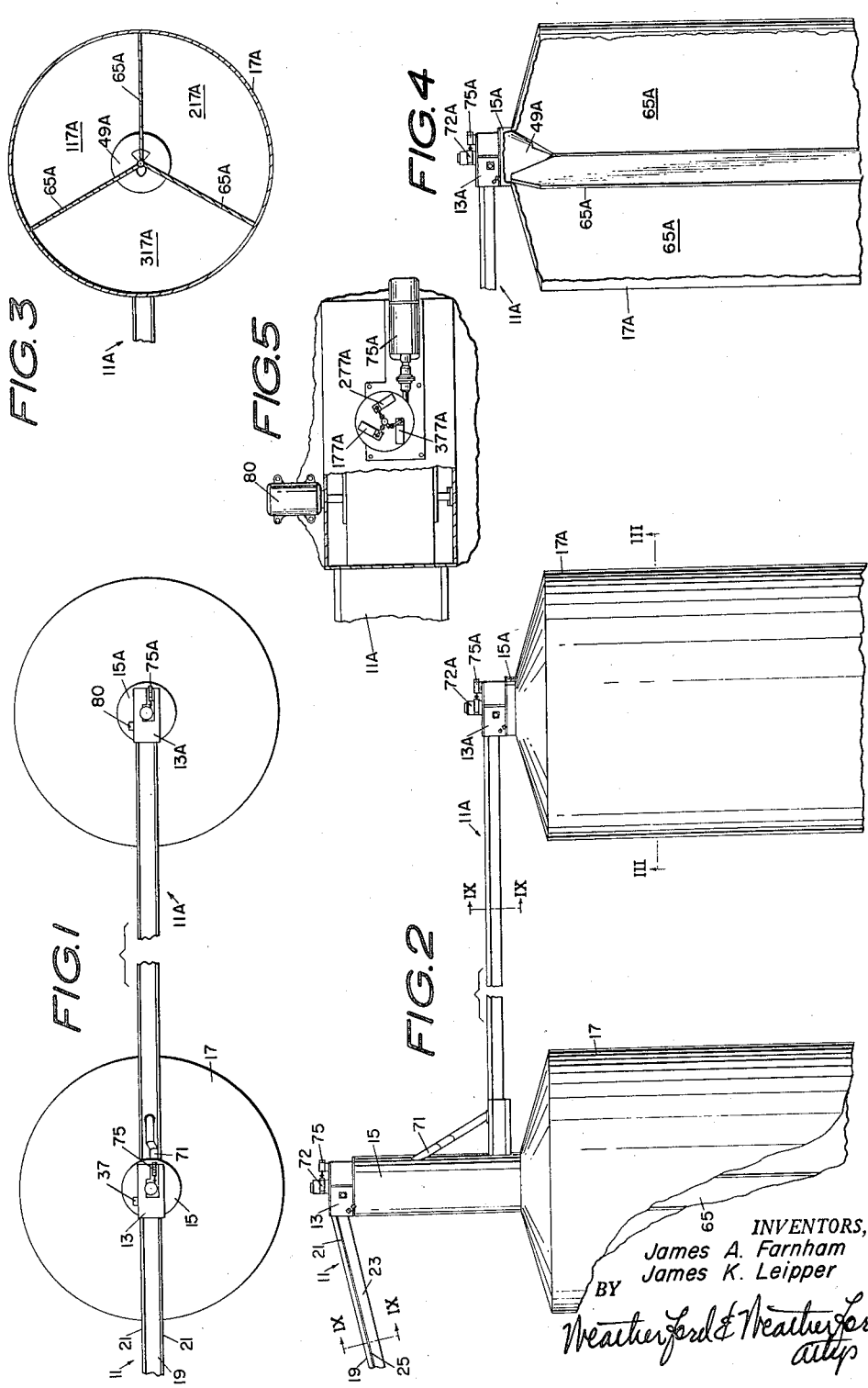
INVENTORS,
James A. Farnham
James K. Leipper
BY Weatherford & Weatherford
attys

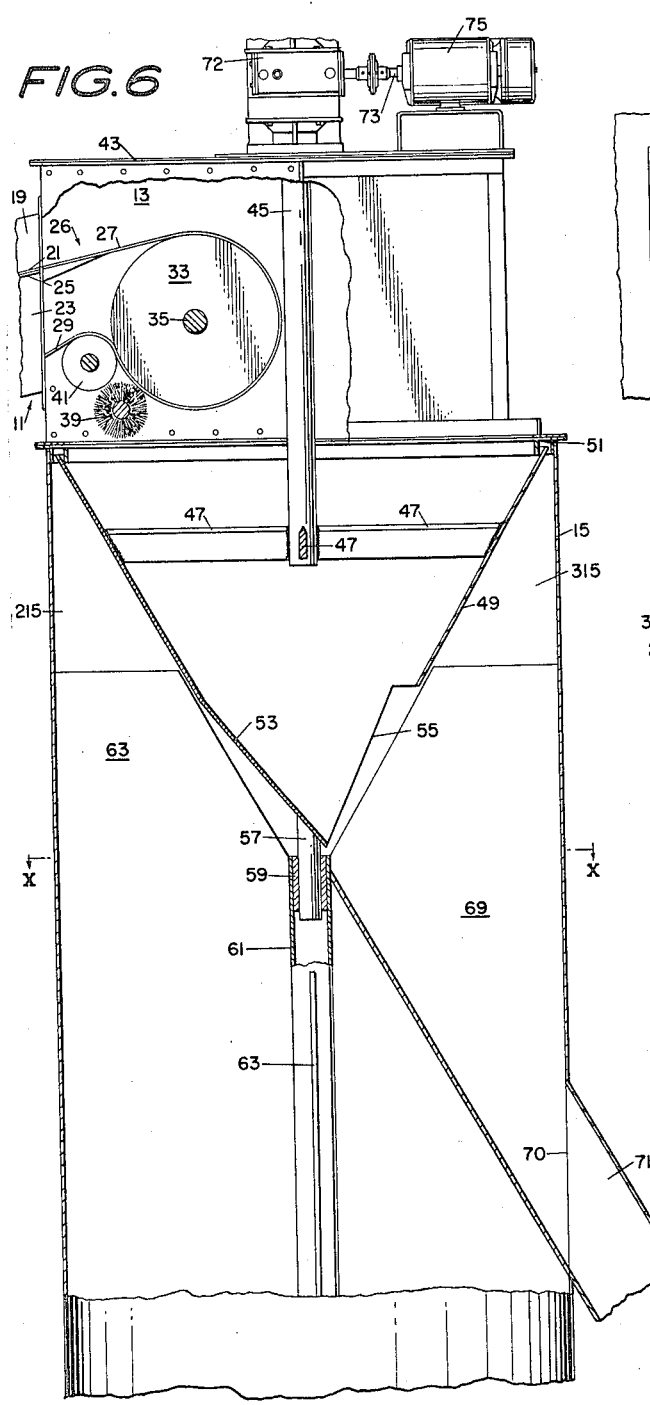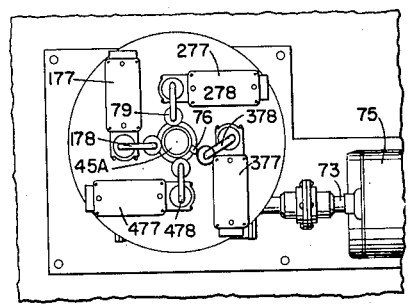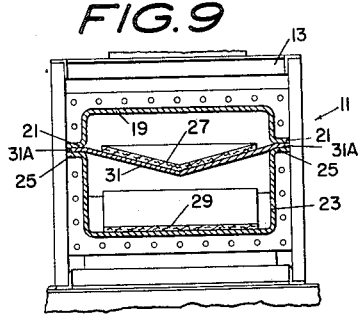

INVENTORS,
James A Farnham
James K. Leipper
BY Weatherford & Weatherford
attys

Dec. 22, 1959   J. A. FARNHAM ET AL   2,918,185
ROTARY CONE VALVE MEANS
Filed May 21, 1958   4 Sheets-Sheet 4

INVENTORS,
James A. Farnham
James K. Leipper
BY
Weatherford & Weatherford
attys

United States Patent Office 2,918,185
Patented Dec. 22, 1959

2,918,185
ROTARY CONE VALVE MEANS

James A. Farnham and James K. Leipper, Memphis, Tenn., assignors to J. E. Dilworth Company, Memphis, Tenn., a corporation of Tennessee Application May 21, 1958, Serial No. 736,796

9 Claims. (Cl. 214—17)

This invention relates to certain new and useful improvements in rotary core valve means particularly adapted for handling finely divided materials such as of the nature of carbon black. The utilization of such finely divided materials in various aspects of industry, as for example the utilization of carbon black in connection with the manufacture and processing of automobile tires, presents a wide variety of problems, and among the most vexing of these problems is that of so managing such finely divided material, particularly during transportation or delivery of the material, as to prevent any leakage or sifting of the material, which creates an undesired waste of material as well as deleteriously effecting surrounding matters.

The present invention relates to rotary cone valve means which is adapted to handle finely divided material, such as carbon black, to distribute such material from a conveyor source into selected bins, or to deposit the material for transitional delivery to remote bin areas.

The present invention comprises a new and novel rotary valve means constructed and arranged in such a manner as accurately to control and deliver finely divided material received from a system including conveyor means into a selected bin or to selected other directions with accuracy and while maintaining the dust tight enclosure of the material preventing any sifting or escape thereof.

The principal object of the present invention is to provide a new and novel means for distributing finely divided material comprising a driven and controlled rotary valve member supported for directional rotation to discharge in a selected direction.

A further object of the invention is to provide such a valve member which is substantially conical together with new and novel means for supporting same.

A further object of the invention is to provide in a system for handling finely divided material, valve means for distributing such material.

A further object of the invention is to provide such a rotary valve means, together with controls for automatically interrupting drive of the rotary valve when selected position has been achieved; and A further object of the invention is generally to improve the design, construction and efficiency of valve means for handling finely divided material.

The means by which the foregoing and other objects of the present invention are accomplished and the manner of their accomplishment will be readily understood from the following specification upon reference to the accompanying drawings, in which:

Fig. 1 is a top plan view with parts broken away for purposes of illustration.

Fig. 2 is a fragmentary side elevational view with parts broken away for purposes of illustration.

Fig. 3 is an inverted sectional plan view taken as on the line III—III of Fig. 2.

Fig. 4 is an additional view of the right hand tank and related devices as seen in Fig. 2, with parts broken away for purposes of illustration.

Fig. 5 is a fragmentary top plan view of the device of Fig. 4, with parts broken away for illustration on an enlarged scale.

Fig. 6 is a fragmentary view, partly in section and partly in elevation, of the control cylinder with parts broken away for purposes of illustration.

Fig. 7 is a fragmentary top plan view on a further enlarged scale of the device as shown in Fig. 6 illustrating the drive control means.

Fig. 9 is a fragmentary cross sectional view taken as on the line IX—IX of Fig. 2.

Figure 8:
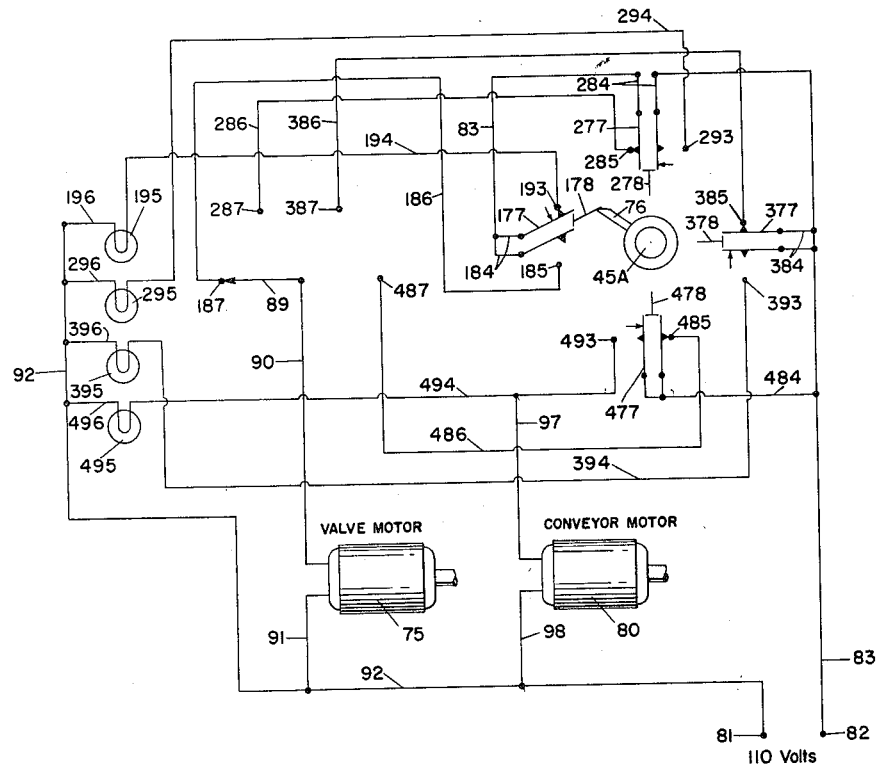
Fig. 8 is a schematic wiring diagram of the control system of Fig. 7.
Figure 10:
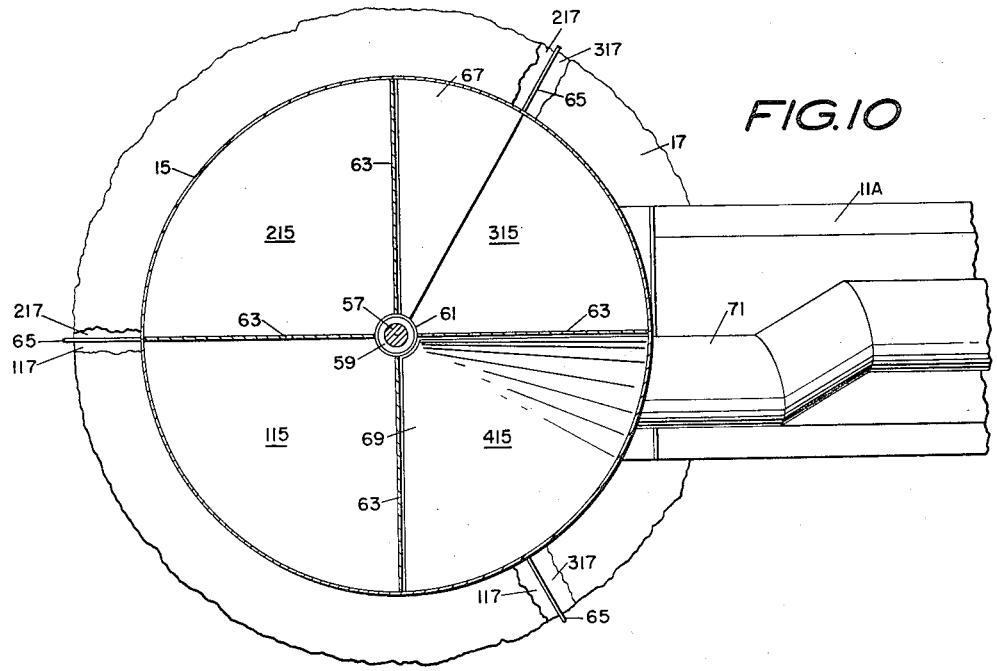
Fig. 10 is a fragmentary sectional plan view taken as on the line X—X of Fig. 6.
Figure 11:
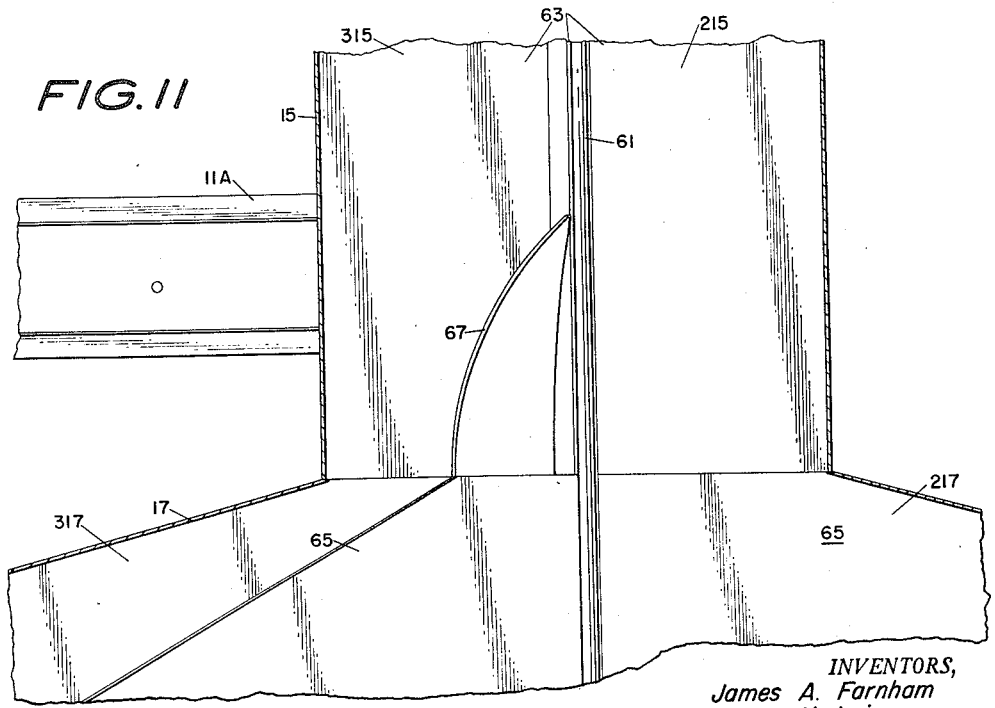
Fig. 11 is a fragmentary sectional rear view of a portion of the device.

Referring now to the drawings in which the various parts are indicated by numerals, the material to be handled by the present system is delivered from a source (not shown) by a conveyor generally indicated at 11 to a discharge chamber 13 and thence by gravity into a control tower 15. From the control tower the flow of material being handled is, under the influence of gravity, directed either into a storage tank 17, or if desired, may be directed onto a second conveyor indicated generally at 11A for transportation to a similar discharge chamber 13A mounted in conjunction with a supplemental storage tank 17A.

The conveyors 11, 11A are of substantially identical construction and are primarily adapted for handling finely divided material with a minimum of spillage and for tightly containing such material against accidental discharge either from any minor spillage or otherwise, providing by their precise construction a dust tight housing and a conveyor belt therein completely to contain the finely divided material. Thus each of conveyors comprises a hollow elongated housing which consists of a relatively shallow upper section 19 which comprises in cross section a substantially hat-shaped section including outwardly projecting flanges 21, and a lower conveyor housing section 23 which is of substantially greater depth than section 19 and comprises in cross section an inverted hat-shaped section having outwardly projecting flanges 25. The width of the sections 19, 23 is substantially equal and the flanges 21, 25 project outwardly a substantially equal distance from the sections, so that when associated together, as best shown in Fig. 9, the flanges 21 are superposed over flanges 25, and when joined together sections 19, 23 form a housing which is substantially box-like in cross section.

Mounted within each of the conveyor housings is a conveyor belt 26 preferably of flexible material and having an upper flight 27 and a lower flight 29. The upper flights 27 are respectively supported upon support plates 31 which are shaped in cross section as a shallow V with the edges 31A of plate 31 extending outwardly to lie between the respective flanges 21, 25. Thus the lower surfaces of edges 31A are supported upon the lower flanges 25 and the upper flanges 21 are seated on the upper surfaces of edges 31A, with the flanges 21, 25 and edge portions 31A being rigidly and tightly secured together, completing the securing of the housing sections to form the complete conveyor housings and providing fastening for the conveyor belt support in rigid supporting condition.

The upper flight 27 of each conveyor belt, formed, as stated of the flexible material, is supported upon the V-shaped support plate 31, and due to the flexible nature of the conveyor belt material the belt conforms in cross sectional shape throughout the upper flight providing a shallow V-shaped belt flight for the better retention of finely divided material in its carriage by the conveyor belt. The lower flight 29 of each conveyor belt is supported in flat condition upon the upper surface of and within the crown of the lower hat-shaped housing section 23.

Thus it will be seen that the conveyors provide a means for retaining material being moved from the source against accidental discharge from the belt in virtue of the shallow V cross sectional shape in which the upper flight is maintained, greatly limiting the possibility of accidental discharge of the material from the conveyor means. Additionally, as the conveyor is carried within the tightly closed housing formed of the respective hat sections 19, 23 the chance of external discharge of dust from the material being conveyed is minimized substantially to non-existence.

Conveyor 11 discharges into discharge chamber 13 within which is mounted a pulley 33 mounted upon a shaft 35, the shaft 35 being driven by a suitable motor 37 mounted on the housing of discharge chamber 13, the motor being arranged so as to drive the upper flight 27 toward the discharge chamber, to pass around the pulley 33 and to deposit by gravity the materials carried thereon. It will be observed that the upper flight is flattened from its cross sectional V-shape as it passes about the pulley 33.

Mounted in adjacency to the lower periphery of pulley 33 and in position to engage the surface of belt 26 as it passes around the pulley is a brush 39 which is adapted to remove any clinging portions of the material being handled from the surface of the belt and to discharge same into the discharge chamber. The belt 26 as it passes into the lower flight passes over an idler pulley 41, the idler pulley 41 being driven by the passage of the belt thereover and being in contact with the brush 39 effects rotation of the brush to enhance the cleaning of the belt as it passes over the brush.

The discharge chamber 13 is a box-like chamber which is open-bottomed for gravity discharge from the discharge chamber of materials delivered thereinto. The discharge chamber is mounted with its open bottom seated upon the upper end of the control tower 15, the upper end of tower 15 being provided with an opening communicating with the open bottom of discharge chamber 13 so that the materials delivered into discharge chamber 13 are deposited into control tower 15. Discharge chamber 13 is provided with a top closure 43. Supported and journalled in top 43 is a downwardly extending shaft 45, the upper end of which projects above top 43 and into engagement with drive means mounted upon top 43 hereinafter to be described. Shaft 45 extends downwardly throughout the depth of discharge chamber 13 and projects below the open bottom of the chamber through the opening in the top of tower 15 and into the upper end of control tower 15.

Rigidly fixed to and extending radially from shaft 45 adjacent its lower end are a plurality of blade-like spokes 47 which are preferably provided with beveled edges along their upper surfaces in order to provide a minimum surface, substantially preventing the retention of any of the material handled which is discharged through the discharge chamber into the upper portion of tower 15. Preferably spokes 47 are circumferentially equally spaced apart around the shaft 45 and project an equal distance outwardly away from the shaft 45. At their outer ends spokes 47 engage and are rigidly fixed to the interior of a funnel valve 49 which is of substantially conical shape, and at its upper and larger dimension is of diameter substantially equal to, though slightly less than, the diameter of tower 15. In order that the funnel valve 49 will be insured of receiving all of the material which is discharged into the tower 15, the upper edge of funnel valve 49 is shielded within and embraced by a peripheral inverted channel 51 fixed to and extending around the inner periphery of the upper end of tower 15. As best shown in Fig. 6, the upper edge of funnel valve 49 extends between the flanges of the inverted channel member 51 and is housed therein so as to prevent and minimize the possibility of escape of any of the material to be handled upwardly over the upper edge of funnel valve 49.

Adjacent its lower end, funnel valve 49 is truncated by a flat plate 53 which extends from a side portion of funnel valve 49 diagonally across the vertical axis of the funnel valve and cuts off the apex of the conical shape of the funnel valve, as in Fig. 6. Plate 53 provides a directional slide surface for directing the material received into funnel valve 49 toward an opening 55 formed in the opposing portion of the funnel valve 49 in order to direct the material received within the funnel valve to discharge therefrom.

In axial alinement with shaft 45 a stub shaft 57 is rigidly fixed to and projects below the slide plate 53, and at its lower end is rotatably supported in a suitable bearing 59 which is carried by a support 61. Thus it will be seen that funnel valve 49 is supported at its lower end by the stub shaft 57 which is rotatable within bearing 59, and thereabove the funnel valve is carried by the spokes 47 forming a sort of supporting spider, through which the funnel valve 49 is drivingly and rotationally carried by the shaft 45, so that upon rotation of the shaft 45 the funnel valve will be rotated suitably, being supported at its lower end in this rotation, as just stated, by stub shaft 57.

Tower 15 is divided into compartments 115, 215, 315, 415 by upright walls 63. Support 61 extends downwardly throughout the length of tower 15 and therebelow, and each of the walls 63 is at its inner edge rigidly fixed to support 61 and at its outer edge is rigidly fixed to the interior of the outer wall of tower 15. At their upper edges the walls 63 are diagonally cut off to accommodate the rotational movement of the funnel valve 49 and terminate substantially below the upper end of tower 15, but above the level of discharge opening 55. In this manner the discharge from opening 55 is directed to be discharged within one of the compartments formed within tower 15 by the walls 63, and by the diagonal cutoff of the baffles 63, the funnel valve 49 is enabled to be freely rotated, yet to be contained closely within the cutoff portions of these baffles.

As stated previously, tower 15 is seated upon the upper end of storage tank 17, and the storage tank is provided with an opening matching with the open bottom of tower 15 in order to receive the materials directed through tower 15 and to retain same in the storage tank. Support 61 not only extends below tower 15, but also extends downwardly through the depth of tank 17 to the bottom thereof where it is supported. Storage tank 17 is provided with a plurality of compartmenting walls 65 which divide the tank into suitable compartments 117, 217, 317. Walls 65 at their inner edges are connected to support 61 and tightly engage the interior of the tank wall at their outer edges.

It will be observed that in the preferred embodiment storage tank 17 is by walls 65 divided into three compartments, and that tower 15 is divided by walls 63 into four compartments. Three of the four compartments in tower 15, as compartments 115, 215, 315, communicate respectively with the compartments 117, 217, 317 in tank 17 and are arranged and are adapted in order that the material discharged into one of the tower compartments will discharge therefrom into one of the tank compartments. The fourth of the tower compartments, compartment 415, is provided with a lateral discharge spout, which is arranged in communication with the housing for conveyor 11A. Thus it will be seen that as the funnel valve 49 is rotated from compartment to compartment of tower 15 it will successively direct the discharge of material being handled by the system into a selected one of the compartments of the tower, and thus will direct the material therefrom into either a selected compartment of the tank 17, or downwardly from spout 67 into the conveyor 11A for transportation beyond the initial portion of the system.

As is apparent in the preferred embodiment compartments 115, 215, 315, 415 comprise quadrants of the cylindrical tower, each extending through 90 degrees, while the tank compartments 117, 217, 317 respectively extend through 120 degrees. The tower is, as stated, seated upon the upper end of the tank with the tower wall 63 which separates compartment 115 from compartment 215 vertically in alinement with the tank wall 65 which separates tank compartment 117 from tank compartment 217, so that tower compartment 115 directly overlies tank compartment 117, and tank compartment 215 directly overlies tank compartment 217. Thus as material is discharged into either tower compartment 115 or tower compartment 215 such material will discharge directly by gravity into the communicating tank compartment 117 or 217 therebelow.

Tower compartment 315 overlies a portion of tank compartment 317 and also overlies a portion of tank compartment 217, since the tank wall 65 which separates compartment 217 from compartment 317 is circumferentially offset from the tower wall 63 which separates tower compartment 215 from tower compartment 315. In order to direct material from compartment 315 into tank compartment 317, and to prevent delivery of material from compartment 315 into tank compartment 217, compartment 315 is provided with a diagonally disposed plate 67, which at its upper edge is rigidly fixed to tower wall 63 separating compartment 315 from compartment 215, and at its lower edge is rigidly fixed to the upper edge of tank wall 65 which separates compartment 217 from compartment 317. Plate 67 at its inner edge is fixed to support 61 and extends outwardly therefrom into engagement with the interior of the wall of tower 15. The remainder of the bottom of compartment 315 is open and in communication with the upper end of compartment 317.

Compartment 415 is segregated from tank 17 by a downwardly curving baffle 69 which is fixed at its opposite upper edges to two of the tower walls 63, being those walls which separate compartment 315 from compartment 415, and compartment 115 from compartment 415, and curving downwardly into engagement with the interior of the wall of tower 15 within compartment 415. The curved baffle 69 is sharply inclined downwardly, and substantially at its point of engagement with the wall of tower 15, the wall is apertured as at 70 and communicates with a lateral discharge spout 71 which is connected and in communication with conveyor 11A.

Thus it will be seen that tower 15 provides for the control of the distribution of material discharged into the tower so that material discharging into compartment 115 is directed into tank compartment 117, that discharging into compartment 215 is directed into tank compartment 217, that discharging into compartment 315 is directed into compartment 317, and that discharged into compartment 415 is directed into lateral discharge spout 71.

As has been previously pointed out, funnel valve 49 is rotatably supported for rotation about its vertical axis. In order to control the discharge of material handled by the system into a selected tower compartment and thence to its ultimate destination, the rotation of the funnel valve is controlled by selective drive means.

As heretofore indicated, shaft 45 extends upwardly through discharge chamber top 43 and into engagement with a speed reducer 72 by which the shaft 45 is connected with the driven shafting 73 of a valve drive motor 75. Additionally, the shaft 45 is by the reducer connected to a shaft extension 45A which extends upwardly beyond the top of speed reducer 72 and which is turned conjointly with shaft 45 when operated by motor 75. Above speed reducer 72 a projecting cam lobe 76 is rigidly fixed to and projects from shaft extension 45A for the purpose of operating a plurality of switches having shiftable arms disposed in the rotational path of cam lobe 81, the switches and arms being superposed on speed reducer 72. As best shown in Fig. 7, the switches are equal in number to the number of compartments contained in tower 15, and in the present embodiment comprise four switches, 177, 277, 377, 477. Each of the switches, as stated, is provided with a swingably mounted arm respectively indicated at 178, 278, 378, 478, the switch arms being also diagrammatically indicated by the broken lines in the schematic wiring diagram, Fig. 8. Preferably each of the switch arms carries a roller 79 to facilitate engagement with cam lobe 76 and passage of the cam lobe beyond the switch and arm when operation of a selected switch is completed.

The interengagement of cam lobe 76 with the switch arms 178, 278, 378, 478, pursuant to rotation of the cam lobe with the shaft 45 and shaft extension 45A, provides limit control means for accurately positioning funnel valve 49 at a selected position to discharge into one of the tank compartments. Each of the switches 177, 277, 377, 477 is a double throw switch normally urged into engagement with one contact and out of engagement with an opposing contact, the urging force being indicated in Fig. 8 by the arrows on the switches, and which may be applied by a suitable spring or other means not specifically shown.

The switches are shiftable in the present embodiment under the action of cam lobe 76 against the urging force away from the one contact and into engagement with the opposing contact, and upon release of the influence of the cam lobe on a switch the urging force returns the switch to the initial normal position. As best shown in Fig. 8, the schematic wiring diagram, the switches are electrically connectable to valve motor 75, and the switch 477 is also connectable to a second conveyor drive motor 80 by which the conveyor belt of conveyor 11A is driven.

The operational system is connected to a suitable source of power such as the 110 volt source indicated at contacts 81, 82. To one of the contacts, as the contact 82, a lead 83 is electrically coupled and is connected as by leads 184, 284, 384, 484 respectively to the switches 177, 277, 377, 477. Switch 177 is normally urged in engagement with contact 185, switch 277 with contact 285, switch 377 with contact 385. These contacts, 185, 285, 385, 485, are respectively connected by leads 186, 286, 386, 486 to the poles 187, 287, 387, 487 positioned for selective engagement by a shiftable selector switch 89. Switch 89 is coupled as by a lead 90 to valve motor 75, and the valve motor is otherwise connected as by a lead 91 to a line 92 which is connected with the other of the source contacts 81.

The shiftable switches, 177, 277, 377, 477, are shiftable under the influence of cam lobe 76 from their normal engagement respectively with contacts 185, 285, 385, 485 into electrical engagement with opposite contacts 193, 293, 393, 493. These latter mentioned contacts are respectively connected by leads 194, 294, 394, 494 to lamps 195, 295, 395, 495, and the lamps are respectively connected by leads 196, 296, 396, 496 to line 92. Additionally, contact 493 is connected by a branch lead 97, coupled to lead 494, to conveyor motor 80, the conveyor motor being otherwise connected as by lead 98 to line 92.

Thus the operational electrical system for the funnel valve 49 is shown. In order to activate the funnel valve, switch 89 is moved to a selected pole. If the switch, for example, is moved to the pole 187, a circuit is completed through valve motor 75 from contact 81 through leads 92, 91, through motor 75, lead 90, switch 89 and pole 187, thence through lead 186, contact 185, switch 177, leads 184 to line 83, and thence to contact 82. With the circuit thus completed the valve motor is energized, effecting drive of shaft 45 and consequent rotation of funnel valve 49 to register the funnel valve for discharge into tower compartment 115. During this rotation shaft extension 45A and lobe 76 carried thereby are equally rotated, and when the funnel valve has been moved into register with the selected tower compartment, the lobe effects shift of switch 177 (see Fig. 8), interrupting the engagement between that switch and contact 185, de-energizing valve motor 75 and interrupting rotational drive of the funnel valve, positioning the funnel valve in stopped condition in registry with the selected compartment. The same movement shifts switch 177 into engagement with contact 193, completing the circuit through lead 194 to lamp 195, thence through lead 196 to line 92, completing a circuit to the lamp so as to energize same and to indicate the location of the funnel valve. It is believed that similar operation with respect to switches 277 and 377 and the circuits in which these switches are respectively disposed is apparent without the necessity of repetition.

With respect to switch 477, the circuit through this switch in normally closed condition engaging contact 485 is effected by shifting switch 89 into engagement with pole 487. Operation of the funnel valve shifts the funnel valve into registry with compartment 415 in manner substantially identical with that already described, and effects interruption of switch engagement of contact 485 and the shift of the switch into engagement with contact 493 under the influence of shaft carried cam lobe 76. Such shift energizes light 495 indicating the position of the funnel valve at compartment 415. It further completes a circuit through lead 97 to motor 80, and thence through lead 98 to line 92, effecting energizing of the motor drive by motor 80 of the second conveyor 11A. Thus, so long as the funnel valve 49 remains in position to discharge into compartment 415, transportation of the material deposited into such compartment and discharged through lateral spout 71 into conveyor 11A is accomplished through drive of the conveyor by the energized motor 80.

The construction of conveyor 11A is substantially identical with that already described for conveyor 11 so that it is believed that repetition of such description is unnecessary. This conveyor, like conveyor 11, is characterized by the tight box-like housing, together with a belt-supporting plate of shallow V-shaped trough-like cross section upon which the upper flight of the flexible conveyor belt is carried and supported in trough-like condition for the better retention of materials transported thereby.

As earlier stated, conveyor 11A discharges into discharge chamber 13A which overlies storage tank 17A. The storage tank 17A is divided by walls 65A into tank compartments 117A, 217A, 317A. Interposed between discharge chamber 13A and tank 17A is a short cylindrical section 15A which is provided to house and support a funnel valve 49A, the construction and arrangement of the valve 49A being substantially identical with that of valve 49, with drive of the valve 49A being effected by a valve drive motor 75A through a similar speed reducer 72A, with the shaft by which the funnel valve is carried in manner similar to shaft 45 being provided with a shaft extension upon which a similar cam is carried for effecting shift of the arms of switches 177A, 277A, 377A. Inasmuch as tank 17A is here shown as the final terminus for material handled by the present system, it is necessary only that the funnel valve be provided with means for selectively driving and positioning it for material discharge in positions equal in number to the number of compartments in the terminal tank, which in this instance is shown as three compartments.

The control of funnel valve 49A is substantially identical with that shown in Fig. 8 with the omission of lead 484, contact 485, switch 487, switch 478, contact 493, leads 496, 494, pole 487, lead 97, motor 80 and lead 98, and it will be understood that the respective operation effected by the switches 177A, 277A, 377A is substantially identical with that described with respect to the operation effected by switches 177, 277, 377, the drive means being provided with a three pole selector switch 89 and poles 187, 287, 387.

It thus will be seen that by the use of the present system finely divided or comminuted material, as for example as of the character of carbon dust, may be transported as by conveyor 11 for distribution. The housing of conveyor 11 is substantially dust tight, as is the communication between the conveyor and discharge chamber 13, which coupled with the material retaining characteristics of the trough-like upper flight of the conveyor belt substantially eliminates any loss or escape of material being handled.

If it is desired that the material delivered by conveyor 11 be stored in tank 17, a suitable compartment of tank 17 may be selected for the reception of such material and the selector switch shifted to energize the chosen circuit for rotating the funnel valve into registry with the requisite tower compartment for directing the material into the selected tank compartment. If, because the tank compartments are filled, or for other reasons, it is desired to further convey the material beyond tank 17, the selector switch is, as described, shifted to pole 487, insuring the rotation of the funnel valve into registry with tower compartment 415, consequent discharge of the material through compartment 415 and spout 71 into conveyor 11A with contemporaneous drive of conveyor 11A being effected to deliver the further transported material to funnel valve 49A by which direction of discharge into a selected compartment of tank 17A may be effected.

It has been found that the entire system is substantially completely effective in preventing any loss of or damage from accidentally discharged material, reducing waste, and further that the system is highly effective in accurately distributing the material handled therein suitably for storage and other use.

We claim:

1. In means for handling finely divided material, means for controlling the distribution of such material comprising a control tower, substantially equally spaced upright walls dividing said tower into open-topped compartments, a substantially conical open-topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, an inverted peripheral channel carried by the upper end of said tower, the periphery of the top of said funnel valve being embraced within said channel to shield against overflow outwardly beyond said valve top periphery, said valve adjacent said lowermost apex having an outwardly and downwardly directed discharge opening for directing passage of material from said valve, said discharge opening having a width less than the spacing between adjacent said upright walls, a flat plate opposite said opening diagonally truncating said apex and offsetting said apex from axial alinement with said shaft means, said plate sloping to said opening to direct material to said opening, a stub shaft fixed to and projecting vertically below said plate in axial alinement with said shaft means, means journalling said stub shaft, said upright walls adjacent said valve including diagonally cut off upper edges complementary to the cone of rotation of said valve and extending upwardly beyond the upper limit of said opening, said diagonally cut off upper edges closely embracing said valve to confine discharge of material between adjacent upright walls.

2. In means for handling finely divided material, means for controlling the distribution of such material comprising a control tower, substantially equally spaced upright walls dividing said tower into open-topped compartments, a substantially conical open-topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, an inverted peripheral channel carried by the upper end of said tower, the periphery of the top of said valve being embraced within said channel to shield against overflow outwardly beyond said valve top periphery, said valve adjacent said lowermost apex having a downwardly and outwardly directed discharge opening for directing passage of material from said valve, said opening having a width less than the spacing between adjacent upright walls, a plate opposite said opening diagonally truncating said apex and offsetting said apex from axial alinement with said shaft means, said plate sloping to said opening to direct material to said opening, a stub shaft fixed to and projecting vertically below said plate in axial alinement with said shaft means, means journalling said stub shaft, said upright walls adjacent said valve including diagonally cut off upper edges complementary to the cone of rotation of said valve and extending upwardly beyond the upper limit of said opening, said diagonally cut-off upper edges closely embracing said valve to confine discharge of material between adjacent upright walls.

3. In means for handling finely divided material, means for controlling the distribution of such material comprising a control tower, substantially equally spaced upright walls dividing said tower into open-topped compartments, a substantially conical open-topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, said valve adjacent said apex having a downwardly and outwardly directed discharge opening for directing passage of material from said valve, said opening having a width less than the spacing between adjacent said upright walls, a flat plate opposite said opening diagonally truncating said apex and offsetting said apex from axial alinement with said shaft means, said plate sloping to said opening to direct material to said opening, a stub shaft fixed to and projecting vertically below said plate in axial alinement with said shaft means, means journalling said stub shaft, said upright walls adjacent said valve including diagonally cut off upper edges complementary to the cone of rotation of said valve and extending upwardly beyond the upper limit of said opening, said diagonally cut off upper edges closely embracing said valve to confine discharge of material between adjacent upright walls.

4. In means for handling finely divided material, means for controlling the distribution of such material comprising a control tower, substantially equally spaced upright walls dividing said tower into open-topped compartments, a substantially conical open-topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, said valve adjacent said apex having a downwardly and outwardly directed discharge opening for directing passage of material from said valve, said opening having a width less than the spacing between adjacent said upright walls, a plate opposite said opening sloping to said opening to direct material to said opening, a stub shaft fixed to and projecting vertically below said valve in axial alinement with said shaft means, means journalling said stub shaft, said upright walls adjacent said valve including diagonally cut off upper edges complementary to the cone of rotation of said valve and extending upwardly beyond the upper limit of said opening, said diagonally cut off upper edges closely embracing said valve to confine discharge of material between adjacent upright walls.

5. In means for handling finely divided material, means for controlling the distribution of such material comprising a control tower, upright walls dividing said tower into compartments, a substantially conical open topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, said valve adjacent said apex having a downwardly and outwardly directed discharge opening for directing passage of material from said valve, a plate opposite said opening sloping to said opening to direct material to said opening, a stub shaft fixed to and projecting vertically below said valve in axial alinement with said motor shaft means, means journalling said stub shaft.

6. In means for handling finely divided material, means for controlling the distribution of such material comprising a control tower, a substantially conical open topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, said valve adjacent said apex having a downwardly and outwardly directed discharge opening for directing passage of material from said valve, a plate opposite said opening sloping to said opening to direct material to said opening, a stub shaft fixed to and projecting vertically below said valve in axial alinement with said shaft means, and means journalling said stub shaft.

7. In means for handling finely divided material, means for controlling the distribution of such material comprising a control tower, upright walls dividing said tower into compartments, a substantially conical open topped funnel valve rotatably supported in said tower with the apex of said valve extended downwardly, substantially vertical shaft means extending downwardly into said tower and within the top of said valve, a plurality of spokes extending radially from the lower end of said shaft means into engagement with the interior of said funnel valve, said spokes being fixed to said valve to connect said valve to said shaft means for valve rotation pursuant to shaft rotation, means shielding the top of said valve against overflow outwardly beyond said valve top, said valve adjacent said apex having a discharge opening for directing passage of material from said valve, a plate opposite said opening sloping to said opening to direct material to said opening, a stub shaft fixed to and projecting vertically below said valve in axial alinement with said shaft means, and means journalling said stub shaft.

8. In means for handling finely divided material, means for controlling the distribution of such material comprising a control tower, substantially equally spaced upright walls dividing said tower into open-topped compartments, a substantially conical open-topped funnel valve rotatably supported in said tower with the apex of said valve extended downwardly, means rotatably supporting said valve, an inverted peripheral channel carried by the upper end of said tower, the periphery of the top of said valve being embraced within said channel to shield against overflow outwardly beyond said valve top periphery, said valve adjacent said apex having a downwardly and outwardly directed discharge opening for directing passage of material from said valve, said opening having a width less than the spacing between adjacent said upright walls, a plate sloping to said opening to direct material to said opening, said upright walls adjacent said valve including diagonally cut off upper edges complementary to the cone of rotation of said valve and extending upwardly beyond the upper limit of said opening, said cut-off upper edges closely embracing said valve to confine discharge of material between adjacent upright walls.

9. In means for handling finely divided material, means for controlling the distribution of such material comprising a control tower, upright walls dividing said tower into a multiplicity of compartments, a substantially conical open topped funnel valve rotatably supported in said tower with the apex of said valve extended downwardly, electric powered motor means supported adjacent said tower, substantially vertical motor shaft means coupled to said motor means and extending downwardly into said tower and within the top of said valve, means connecting said valve to said shaft means for valve rotation pursuant to motor drive, said valve adjacent said apex having a discharge opening for directing passage of material from said valve, a stub shaft fixed to and projecting vertically below said valve in axial alinement with said motor shaft means, means journalling said stub shaft, and means for limiting drive of said motor means, including an upwardly extending shaft extension driven with said motor shaft, a lobe carried on said shaft extension, a like multiplicity of switches disposed in the path of rotation of said lobe, said switches being electrically connected with said motor means, switch engagement by said lobe being effective to open the switch engaged and interrupt the circuit to said motor means to stop motor drive and halt valve rotation.

References Cited in the file of this patent

UNITED STATES PATENTS

| | | |
|---|---|---|
| 481,080 | Thompson | Aug. 16, 1892 |
| 2,100,154 | Ashton | Nov. 23, 1937 |
| 2,436,624 | Volk | Feb. 24, 1948 |
| 2,600,795 | Morrison | June 17, 1952 |
| 2,806,486 | McDonald | Sept. 17, 1957 |

FOREIGN PATENTS

| | | |
|---|---|---|
| 861,899 | Germany | Jan. 8, 1953 |